United States Patent [19]

Lentz

[11] 3,780,321

[45] Dec. 18, 1973

[54] LINEAR DISCHARGE CIRCUIT

[75] Inventor: Norman Eugene Lentz, North Andover, Mass.

[73] Assignee: Bell Telephone Laboratories, Incorporated, Murray Hill, Berkeley Heights, N.J.

[22] Filed: Oct. 2, 1972

[21] Appl. No.: 294,455

[52] U.S. Cl. .............................................. 307/304

[51] Int. Cl. .............................................. H03k 3/26

[58] Field of Search ..................... 307/304, 246, 228

[56] References Cited

UNITED STATES PATENTS

| | | | |
|---|---|---|---|
| 3,483,464 | 12/1969 | Embree et al. | 307/304 X |
| 3,392,352 | 7/1968 | White | 307/304 X |
| 3,502,902 | 3/1970 | Grein | 307/228 |
| 3,566,307 | 2/1971 | Morris | 307/304 X |

*Primary Examiner*—John W. Huckert
*Assistant Examiner*—R. E. Hart
*Attorney*—W. L. Keefauver

[57] ABSTRACT

A capacitor is linearly discharged through a series circuit formed by the drain-source path of a field effect transistor and a resistor. Linear discharge is provided by maintaining a fixed voltage across the resistor, and this is accomplished by connecting the gate-source junction of the field effect transistor in parallel with the resistor; the gate-to-source voltage will be constant provided only that the source current is constant and this is assured by means of a constant current generator connected to the field effect transistor source lead.

4 Claims, 3 Drawing Figures

LINEAR DISCHARGE CIRCUIT

BACKGROUND OF THE INVENTION

This invention relates to circuits for producing linear waveforms, and more particularly to capacitor circuits using a field effect transistor to provide linear discharge.

Many prior art circuits provide voltages which vary linearly with time. These are, for example, often used to generate sweep signals for deflecting electron beams in cathode ray tubes, but linearly charging or discharging a capacitor can also be used to produce a time delay. In conventional capactive time delay circuits, the capacitor is discharged exponentially and the steep initial slope of the discharge causes a large part of the voltage to be wasted at a rapid rate. In comparison, circuits utilizing the linear discharge make effective use of the entire discharge voltage and provide slower voltage change for a given capacitance. In addition, an exponential discharge over a large range will require a proportionately large charging source, whereas with a constant discharge current the charging voltage may be much smaller. The same comparison is, of course, applicable between exponential and linear charging circuits.

Accordingly, for those applications requiring linear waveforms, many arrangements have been proposed for linearly charging and discharging a capacitor. The principal technique imposes a constant current on the discharge path.

One arrangement for producing the constant current takes advantage of the characteristics of a field effect transistor (hereinafter referred to as an FET). As suggested in Chapter 7 of FET Applications Handbook by Jerome Eimbinder, 1967, if, for example, the gate-to-source voltage of an FET is fixed, this will establish operation on one of the specific gate-to-source voltage characteristic curves of that FET. For the constant current region of the curve, where a constant drain current exists for a range of drain-to-source voltages, a capacitor connected in series with the drain-source path will be discharged by a constant current. Accordingly, an FET and a capacitor in series will provide linear discharge provided only that the gate-to-source voltage is externally fixed to establish the constant drain current.

It has also been recognized that a series combination of a capacitor and a resistor will provide linear discharge if an external mechanism is provided to maintain a constant voltage across the resistor. The resultant constant current through the capacitor yields a linear discharge voltage. A common mechanism for maintaining the fixed voltage across the resistor is a circuit configuration which bootstraps the resistor, and as is illustrated by J. Millman and H. Taub in *Pulse Digital and Switching Waveforms*, McGraw-Hill, 1965, beginning at pages 558, bootstrapping conventionally requires a large coupling capacitor to appropriately float the voltage across the resistor. The large capacitors are, of course, inappropriate for circuit integration and accordingly it is desirable to avoid them.

It is the object of the present invention to provide a slow linear discharge of the capacitor and it is a further object to discharge the capacitor through a series resistor and to use an FET in a unique manner to constrain the voltage across the resistor to a fixed value. It is a further object to constrain the voltage across the resistor without the use of a coupling capacitor.

SUMMARY OF THE INVENTION

In accordance with the present invention, a fixed voltage is impressed across a resistor by the unique use of an FET in lieu of alternative circuits, such as conventional bootstrapping. The resistor is connected in parallel with the gate-source junction of the transistor which has its source current fixed by connection to a constant current generator, and the constant source current fixes a constant gate-to-source voltage. This arrangement is in distinction to previously suggested FET constant current circuits which fix the gate-to-source voltage to produce a constant drain or source current.

The capacitor is linearly discharged through a series circuit formed by the drain-source path of an FET and a discharge resistor. Linearity of the discharge is provided by maintaining a fixed voltage across the resistor and this is in turn accomplished by interconnecting the gate-to-source junction of the FET in parallel with the resistor. By virtue of the constant current characteristic of the FET the gate-to-source voltage will be constant provided only that the source current is constant, and this is assured by means of a constant current generator connected to the source lead. The inerent high gate impedance of the FET insures that the capacitor will discharge through the desired series circuit. It is also noted that the FET is an essentially symmetrical device and either nongate lead may be designated as the source or the drain.

The constant current generator needed to establish the fixed gate-to-source voltage may be provided by a uniquely practical emitter-follower having a bootstrap resistor connected across the emitter-base junction. With a low base current guaranteed by the proper selection of biasing, the base-to-emitter voltage across the bootstrap resistor is constant and hence the current through this resistor is constant. This emitter-follower, whose base is connected to the FET source, also acts as an output stage and the capacitor's voltage and hence the drain-to-source voltage are followed by the emitter-follower to provide a low impedance linear output voltage.

DETAILED DESCRIPTION

Figure 1:
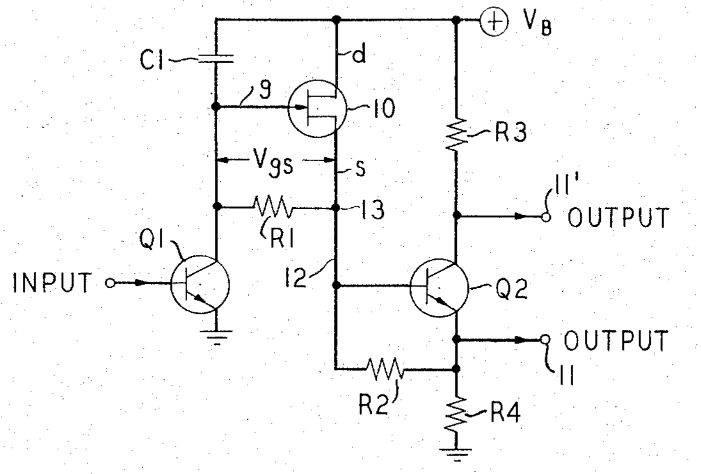
FIG. 1 is a schematic diagram of a discharge circuit for providing a linear waveform in accordance with the present invention.

In FIG. 1 capacitor C1 is charged to potential $V_B$ and discharged to produce a linear voltage waveform at output 11. Transistor Q1 acts as a switch to control the start of the discharge when the input to Q1 turns that transistor OFF. The voltage across capacitor C1 is coupled through the high impedance n-type channel FET 10 to emitter- follower transistor Q2. Transistor Q2 is bootstrapped by resistor R2 to allow the base-emitter voltage to generate a constant current through resistor R2. The base-emitter voltage of a typical silicon emitter-follower remains relatively constant at the forward junction voltage of about 0.7 volts if it is biased to operate above very low emitter currents, as can be provided by resistor R4. The constant current through R2 results in an essentially constant current in lead 12 since the base current is very small compared to the current through R2.

This constant current is applied to node 13 and establishes an equilibrium condition which insures that the source current of FET 10 is constant. This equilibrium condition is explained as follows: Since the current in lead 12 is constant, any change in the source current must produce an identical change in the current through resistor R1. However, any tendency of the source current to change would, as can be seen by reference to FIG. 2, which depicts the drain characteristics of a depletion *n*-type channel FET, result in a corresponding change of the gate-to-source voltage in the same direction. Such a change is, of course, not possible due to the required change in the current through R1 and the resultant change in the gate-to-source voltage in a sense opposite to the change initiated by the hypothesized change in source current. Accordingly, the constant current on lead 12 establishes a constant FET source current. A constant current is also established through resistor R1.

Figure 2:
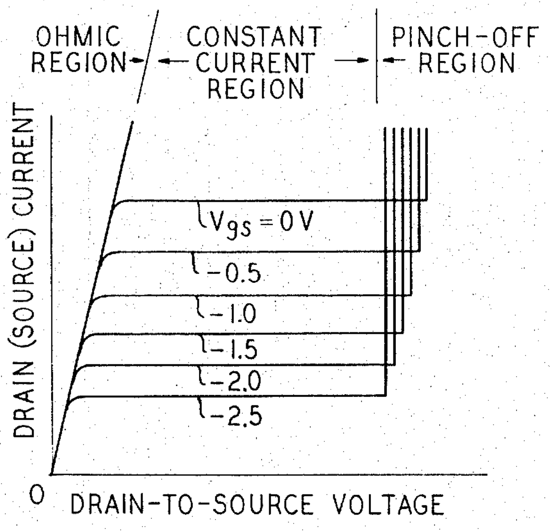
FIG. 2 is a graphical repetition of the drain characteristics of a depletion n-type channel field effect transistor in which the drain current is plotted against the drain-to-source voltage for various gate-to-source voltages.

As can be seen by reference to FIG. 2, for a range of drain-to-source voltages in the constant current region between the ohmic and the pinch-off regions, a constant drain current will establish a fixed gate-to-source voltage, $V_{gs}$. Since the drain current is substantially the source current, the constant source current provided by the constant current on lead 12 defines a fixed $V_{gs}$.

The constant $V_{gs}$ is used to provide a constant discharge current through resistor R1, since the gate of FET 10 offers a very high impedance. With the voltage across resistor R1 fixed, the change in voltage across capacitor C1 as it discharges will produce an equal change of the drain-to-source voltage. As long as the drain-to-source voltage remains in the constant current region, the drain and source currents will remain constant and the voltage at node 13 follows the capacitor voltage. The output state formed by transistor Q2 provides a low output impedance. The voltage at output 11 follows the voltage at node 13 and is thus a duplicate of the capacitor's linear discharge voltage. Similarly, a linear voltage is present at the collector of transistor Q2 as indicated by output 11'. In this case R3 serves as an output load and the voltage at 11' is an inverted version of the voltage at output 11.

Within the limits of saturation, the discharge rate, the output current and the output voltage are independent of the dc supply voltage $V_B$. Only the extremely small leakage currents of FET 10 and capacitor C1 place a lower limit on the discharge current.

Figure 3:
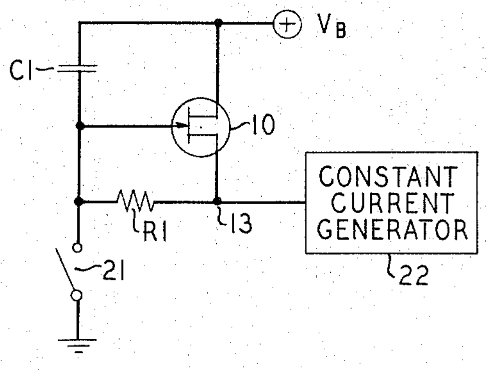
FIG. 3 is a generalized schematic diagram illustrative of the functional components of the circuit of FIG. 1.

The generalized circuit of FIG. 3 operates in the same manner as the specific circuit of FIG. 1. Like elements are designated by like references but in order to provide greater generality, switch 21, which may be any form of switch, including transistor Q1 of FIG. 1, initiates discharge, and source 22, which may be any appropriate current generator, provides the constant current produced in FIG. 1 by the bootstrapped configuration of transistor Q2. The linear output can, of course, be taken from any appropriate point in the circuit of FIG. 3, such as, for example, node 13.

In all cases it is to be understood that the above-described arrangements are merely illustrative of a small number of the many possible applications of the principles of the invention. Numerous and varied other arrangements, such as linearly charging the capacitor rather than discharging it may readily be devised in accordance with these principles by those skilled in the art without departing from the spirit and scope of the invention.

What is claimed is:

1. A circuit comprising, a capacitor; a resistor; a field effect transistor; said capacitor and resistor being connected in series with the drain-source path of the field effect transistor; said resistor being connected in parallel with the gate-source junction of the field effect transistor; and means connected to the drain-source path for providing a constant source current to the field effect transistor; said means for providing a constant source current including an emitter-follower transistor bootstrapped by a resistive connection between the emitter and the base of the emitter-follower, the base of the emitter-follower transistor being connected to the source of the field effect transistor.

2. A circuit as claimed in claim 1 wherein said circuit is supplied with a drain-to-source voltage such that the field effect transistor operates in a constant current region.

3. A circuit as claimed in claim 1 wherein an output terminal is connected to the emitter of the emitter-follower, the emitter-follower providing at the output a low impedance voltage proportional to the voltage of the capacitor.

4. A circuit comprising, a capacitor; a field effect transistor; a series combination of the drain-source path of the field effect transistor and a discharge resistor connected to form a discharge path for the capacitor; means connecting the gate-source path of the field effect transistor across the discharge resistor; and a constant current generator connected to the source of the field effect transistor for maintaining a constant source current; the constant current generator including an emitter-follower transistor having its base connected to the source of the field effect transistor, a bootstrap resistor connected across the base-emitter junction of the emitter-follower transistor, and bias means for operating the emitter-follower so that its base-emitter voltage is essentially fixed.

* * * * *